(No Model.)
W. L. SILVEY.
SEPARATOR FOR BATTERY PLATES.
No. 524,843. Patented Aug. 21, 1894.
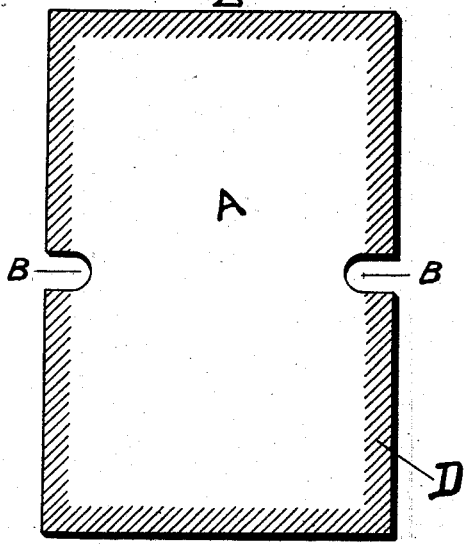
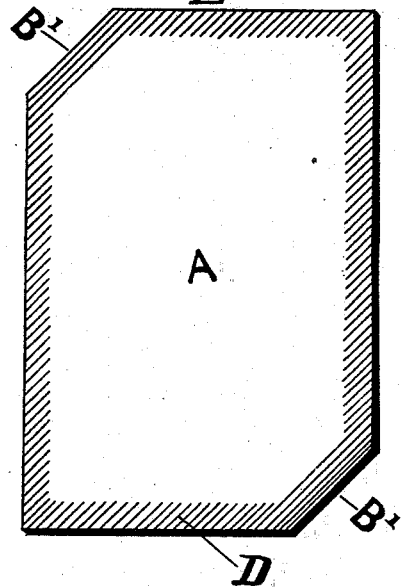
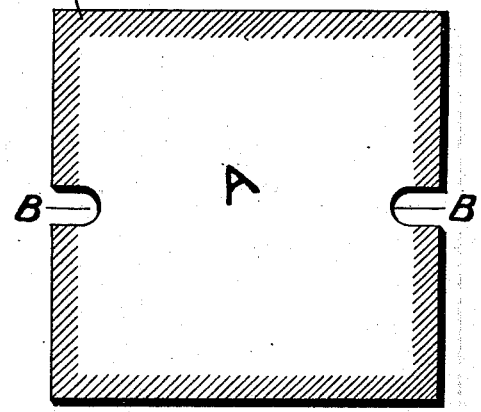
Attest
E. B. Lehman
O. U. Raymond
Inventor.
William L. Silvey

UNITED STATES PATENT OFFICE.

WILLIAM L. SILVEY, OF DAYTON, OHIO.

SEPARATOR FOR BATTERY-PLATES.

SPECIFICATION forming part of Letters Patent No. 524,843, dated August 21, 1894.

Application filed February 12, 1894. Serial No. 499,924. (No model.)

*To all whom it may concern:*

Be it known that I, WILLIAM L. SILVEY, a citizen of the United States, and a resident of Dayton, in the county of Montgomery and State of Ohio, have invented certain new and useful Improvements in Separators for Battery-Plates, of which the following is a specification.

My invention relates to an insulating separating material more particularly adaptable for separating the plates of batteries, especially those possessing the qualities of occluding electrical energy, commonly called storage or secondary batteries.
It is the object of my present invention to construct a separator for battery plates which will be very effectual, will be light, durable and cheap.

My invention further relates to a method of producing the separating material for battery plates, whereby they are mechanically separated and effectually isolated from each other, whether the plates are disposed horizontally or vertically.
It has been proposed by Planté and others to completely wrap the plates in some sort of textile fabric, as for instance felt, flannel or other woolen cloth, also to wrap the plates in parchment, also to inclose the plates in bags or to separate or to inclose the plates with asbestos saturated with silicate of soda, chloride of calcium or other metallic salt soluble in the electrolyte, the object being to prevent disintegration of the separator, but I have found that all of these products are unsuitable for a secondary battery in which an acid solution is used and electrodes insoluble in the electrolyte. With this object in view I have found it desirable to use a separator for the plates which is not soluble, which will be very permeable to the electrolyte, and to the gases generated, and prevent the permeation of the fine particles of which the electrodes are all or partially composed, and which, if allowed to pass through, will cause short circuits, leaks and may possibly entirely suppress the activity of the cell. There are some substances, as for instance asbestos, felt, flannel and cotton, which may be used in connection with an alkaline electrolyte but which are utterly useless in an acid electrolyte owing to the destructive effect of acids upon them, and therefore my invention relates particularly to a separating material equally well adaptable for either alkaline or acid electrolyte, secondary batteries or accumulators, which is a distinctive characteristic of the material which I employ as will be found later on in my specification and pointed out in my claims.

Referring to the accompanying drawings which are made a part hereof, Figures 1, 2, and 3, represent various modifications of my improved separators for battery plates, according to the size and construction of a cell with which they are to be used, in which—

A represents a sheet of separating material, impregnated with a preservative material D.

B is a passage way for the connections (not shown) by which the series of plates are connected together and to the external circuit, and B' shows a similar sheet with a corner of the sheet removed for the passage of the connecting rods or wires B and B' being merely modifications of each other according to the uses to which they are to be applied.

I have already stated that felt, flannel, asbestos and cotton cloth are all entirely unsuitable for storage batteries of both the alkaline and acid types, and that my invention relates to a separator equally adapted to cells of both types. I shall now give my reasons. While it is true that all of the above mentioned materials may be used for alkaline cells, they are entirely unsuitable for cells of the acid type, unless treated by a material of which this is a description, because they are speedily destroyed by the acid by carbonization and disintegration. With asbestos the chemical action which takes place is somewhat different from woolen and cotton fabric, when subjected to a bath of a sulphuric acid solution which my experience has shown to me to be the best type of cell which can be made. When asbestos is placed in a sulphuric acid battery, the acid immediately attacks the chemicals of which it is composed. Asbestos being largely composed of alumina, oxide of iron and other soluble products as well as silica and magnesia, it is evident that a septum composed of this product will produce an extremely high internal resistance in the cell. In fact the chemical composition of asbestos is very similar to steatite, meerschaum and some grades of glass, all of which are good insulators. When asbestos has been placed between the plates of a secondary battery immersed in a sulphuric acid solution and charged the oxide of iron contained will be collected into blotches or veins and produce short circuits, whereby the cell will become discharged during a very short interval of rest, besides the silicate of aluminum and alumina will be acted upon by the sulphuric acid to produce alum which blocks up many of the pores in the asbestos increasing the resistance, besides the magnesia contained is more or less acted upon. In fact I have found asbestos to be almost worthless as an isolator in a battery having sulphuric acid in solution. In my experiments I have found that the lower the internal resistance of a cell the higher the rate of charge and discharge the battery may be subjected to. In order to be able to accomplish this result a separator must be employed which will thoroughly isolate all the plates of the battery at all times, but which at the same time will be very porous after the solution is placed in the cell, and whereby the plate or separator will immediately become almost as good a conductor of electricity as the electrolyte would be were the separator entirely removed. Another prime requisite of a separator is, it must at all times be sufficiently firm to maintain its position between the plates and be sufficiently durable as to not require too frequent renewals.

It is not essential so far as my present invention is concerned, what the peculiar arrangement of the electrodes may be, nor what the construction of the conducting plates may be, as any construction of a battery may be used so long as my separator is employed, but a preferable way is to lay the plates parallel and practically horizontal.

My separator is constructed as follows: I take spruce pine, poplar or other soft wood or material, and reduce it to a thoroughly impalpable mass by boiling, grinding and treating with acids and lime and water until every particle of the original structure has been reduced. It is next washed and passed through rolls and rolled into board of the required thickness for the purpose moisture being removed by heated calendering rolls. This board is now cut into shapes to correspond with the general outlines of the battery plates niches being removed from the plate as shown in Figs. 1, 2, and 3, for the passage of connecting rods or strips by which the electrodes are united together. This porous board being made by a fulling process, I term it pulp board. Sheets of textile material may be used providing the interstices between the threads are sufficiently close to allow the passage of the electrolyte and not the particles of worn electrode, and after being treated so as to preserve the plates in the electrolyte as will now be described. The separators having been prepared of the required number, size and shape, I next prepare a bath of preservative compound with which the sheets are to be impregnated. This preservative compound may be beeswax, pitch, resin or gums, tallow, sperm, animal and vegetable gums or fats without departing from the spirit of my invention, as my invention relates to a hydro-carbon preservative, but I have found a mineral hydro carbon product cheapest such as asphaltum, ozocerite and paraffine, the latter being preferable because it is very easily melted, cools into a bright smooth surface, penetrates well and is not excelled as a perfect insulator, besides it is not affected by acids or alkalies. Therefore any material thoroughly impregnated with paraffine is almost indestructible in an acid or alkaline electrolyte. All storage batteries which are used on moving vehicles, such as omnibuses, street cars or railway cars, are subjected to a more or less rapid vibration. The vibration of the car is transmitted to the battery element by which the plates as well as the liquid are thrown into motion. This motion of the liquid and plates tends to produce a washing motion, which in time will cause a disintegration of the separating plates A along their edges, and will make the frequent renewals of these plates necessary.

Now, therefore, this invention is intended particularly to prevent the destructive wash and wear of the plates, whether produced by a mechanical motion of the liquid caused by the liberation of the gases, by the battery electrodes, or by a mechanical motion of the entire cell. In order to accomplish this object I first prepare my hydro carbon by heating it to the proper temperature, into which I dip my porous sheets A or separators. The preferable way of saturating the separators is along the edges as represented by D, which makes the edges practically acid proof, and when the paraffine becomes cold it binds the fibers of the separator firmly together. The sheet A being thoroughly saturated along the edges with the solid compound D, becomes stiffened on cooling, thereby protecting the inner or porous medium acting as both a binding rim and a stiffener for the center as well as to prevent the destructive washing of the edges.

Having described the essential features of my invention, what I claim as new, and wish to secure by Letters Patent in the United States, is—

1. A battery separating plate consisting of a porous fabric having notched passage ways in its edges, the edge of the plate only combined with a preservative material.

2. A battery separator consisting of a mechanical isolating porous material, the pores and interstices in the separator filled with a preservative insoluble material, the central part of the sheet porous and unsaturated.

3. A battery separator consisting of a flat sheet having two notches in its edges, the sheet consisting of inherently porous material the edges saturated with a hydro carbon, the inner part unsaturated.

4. A battery separator consisting of a porous sheet of insulating material having notched passage ways for battery connectors, the edge of the sheet only combined with a preservative material.

5. A battery separator consisting of a sheet of insulating porous fabric the interstices of the edges only impregnated with a hydro carbon.

6. A battery separator consisting of a sheet of wood pulp board, the edges only combined with paraffine.

In testimony whereof I have set my hand in the presence of two subscribing witnesses.

WILLIAM L. SILVEY.

Witnesses:
O. S. PEASE,
CHAS. V. HUNSAKER.